United States Patent [19]
Hunter

[11] Patent Number: 6,118,459
[45] Date of Patent: Sep. 12, 2000

[54] SYSTEM AND METHOD FOR PROVIDING A JOINT FOR AN ANIMATABLE CHARACTER FOR DISPLAY VIA A COMPUTER SYSTEM

[75] Inventor: Kevin L. Hunter, San Jose, Calif.

[73] Assignee: Electric Planet, Inc., Palo Alto, Calif.

[21] Appl. No.: 08/951,083

[22] Filed: Oct. 15, 1997

[51] Int. Cl.[7] ................................................. G06T 13/00
[52] U.S. Cl. .......................................... 345/474; 345/473
[58] Field of Search .................................. 345/473, 474, 345/420

[56] References Cited

U.S. PATENT DOCUMENTS

| | | | |
|---|---|---|---|
| 4,600,919 | 7/1986 | Stern | 340/725 |
| 4,843,568 | 6/1989 | Krueger et al. | 364/518 |

OTHER PUBLICATIONS

"Skeletal Strokes": S.C. Hsu, I.H.H. Lee, & N.E. Wiseman, 1993 ACM 0–89791–628–X/93/0011.

"Anatomically Based Modelling": Jane Wilhelms & Allen Van Gelder, Univ. of CA, Santa Cruz, 1995.

3dStudio Max, Chapters 27 & 28, 1996.

Anatomy based modeling of the human musculature:Ferdi Scheepers, Richard Parent, Wayne Carlson, Stephen May, 1997.

*Primary Examiner*—Mark K. Zimmerman
*Assistant Examiner*—Mano Padmanabhan
*Attorney, Agent, or Firm*—Hickman Stephens Coleman & Hughes, LLP

[57] ABSTRACT

The present invention provides a system and method for providing an animatable character displayed via a computer system. The character can be made animatable by utilizing ajoint which connects two portions of the character. When one portion of the character is rotated, or moved, with respect to the other portion of the character, then the dimensions of the portion which is being moved remain the same as prior to motion. Accordingly, the present invention can provide an animatable character by utilizing a single image of the character and moving various portions of the character while maintaining the integrity of the character's dimensions.

36 Claims, 14 Drawing Sheets

SYSTEM AND METHOD FOR PROVIDING A JOINT FOR AN ANIMATABLE CHARACTER FOR DISPLAY VIA A COMPUTER SYSTEM

CROSS REFERENCE TO RELATED APPLICATIONS

This application is related to co-pending U.S. patent application Ser. Nos. 60/062,361 and 08/950,404, filed concurrently herewith, with are incorporated herein by reference for all purposes.

BACKGROUND OF THE INVENTION

1. Field of the Invention

The present invention relates generally to a system and method for animation of an object displayed via a computer system. More specifically, the present invention relates to a method and system for animating a character utilizing joints which allow more natural animation.

2. Background

As computer games and internet interaction quickly gain in popularity, the use of animated characters are becoming more prevalent. Characters can be animated through several ways. One way is to utilize a constant feed of video into a computer system. Another way is to utilize a series of static pictures of the character, each still picture being changed minutely from the previous picture to simulate motion. However, these conventional methods are very costly and can be highly labor intensive.

One possible solution which has been attempted is to utilize a single still image of a character and move a portion of the still image, such that the character appears to move. However, current conventional techniques have typically been unable to simulate natural motion. A very limiting problem with the conventional techniques is that the dimensions of the portion of the character which is being moved will typically change as the portion is being moved, thus causing a highly unnatural motion.

Another possible solution might be to compile an image of a character and move individual pieces of the character. For example, if a character is to resemble a person, then the character may be compiled from multiple pieces, including a piece representing a body, a piece representing a head, a piece representing an upper arm, a piece representing a lower arm, and a piece representing a hand. To simulate motion, one or several of the pieces of the compilation can be moved. A problem arises, however, when a piece is moved which has more than one connection. For instance, when an upper arm piece is moved, then the upper arm of the character moves, but the lower arm and hand remain in their fixed positions. Again, the result is a highly unnatural motion of the character. FIG. 1 is an illustration of a conventional method for making a single image of a character animatable. FIG. 2 shows a character 10 in its original position with a torso 14, arms 12A–12B, and joints 16A–16B. When a portion of the character is moved, then the moving portion is projected along the angular rotation of the movement. For example, if the arm 12A of FIG. 2 is moved "down", then the top and bottom edges 18A–18B of the arm 12A are rotated "down". The resulting moved arm 12A' has edges 18A' and 18B' which are closer to each other in width than the edges of the arm 12A prior to movement. Thus, the dimensions of the portion which has been moved in relation to the remaining portion of the character have changed in such a way as to change the integrity of the geometric structure.

Accordingly, what is needed is a system and method for animating a character being displayed via a computer system which can simulate a more natural motion. The present invention address such a need.

SUMMARY OF THE INVENTION

The present invention provides a system and method for providing an animatable character displayed via a computer system. The character can be made animatable by utilizing a joint which connects two portions of the character. When one portion of the character is rotated, or moved, with respect to the other portion of the character, then the dimensions of the portion which is being moved remain the same as prior to motion. Accordingly, the present invention can provide an animatable character by utilizing a single image of the character and moving various portions of the character while maintaining the integrity of the character's dimensions.

A system and method according to the present invention for providing an animatable character displayed via a computer system comprises the steps of providing a first portion of the character, wherein the first portion has a width, providing a second portion of the character, and providing a joint coupling the first portion and the second portion. The system and method further includes rotating the first portion around the joint such that the width of the first portion remains unchanged during the rotation.

It should be appreciated that the present invention can be implemented in numerous ways, including as a process, an apparatus, a system, a device, a method, or a computer readable medium. Features and advantages of the present invention will be presented in more detail in the following specification of the invention and the accompanying figures which illustrate by way of example the principles of the invention.

BRIEF DESCRIPTION OF THE DRAWINGS

The invention, together with further objects and advantages thereof, may best be understood by referencing the following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
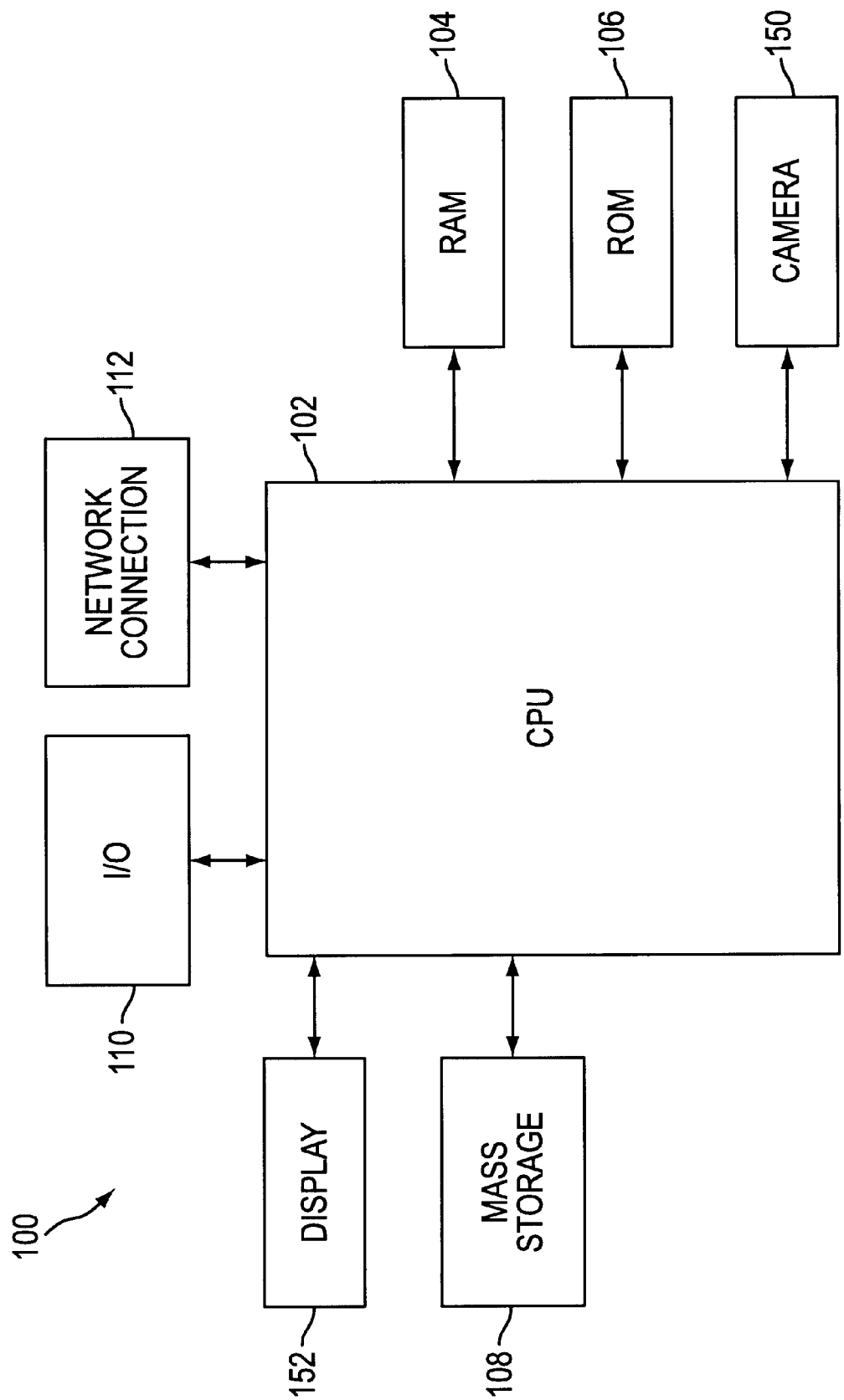
FIG. 1 is an illustration of a conventional method of animating a static image.
Figure 2:
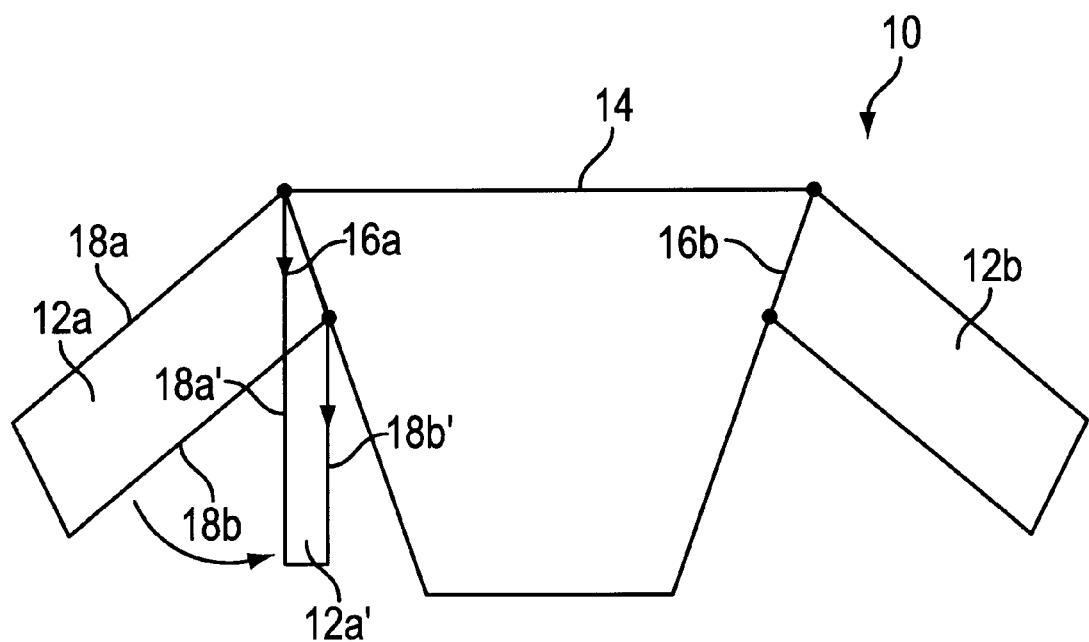
FIG. 2 is a schematic illustration of a general purpose computer system suitable for implementing the present invention.

FIG. 2 is a schematic illustration of a general purpose computer system suitable for implementing the process of the present invention. The computer system includes a central processing unit (CPU) 102, which CPU is coupled bi-directionally with random access memory (RAM) 104 and unidirectionally with read only memory (ROM) 106. Typically RAM 104 includes programming instructions and data, including text objects as described herein in addition to other data and instructions for processes currently operating on CPU 102. ROM 106 typically includes basic operating instructions, data and objects used by the computer to perform its functions. In addition, a mass storage device 108, such as a hard disk, CD ROM, magneto-optical (floptical) drive, tape drive or the like, is coupled bi-directionally with CPU 102. Mass storage device 108 generally includes additional programming instructions, data and text objects that typically are not in active use by the CPU, although the address space may be accessed by the CPU, e.g., for virtual memory or the like. The CPU is also shown to be coupled to a camera 150 and a display 152. Each of the above described computers further includes an input/output source 110 that typically includes input media such as a keyboard, pointer devices (e.g., a mouse or stylus) and the like. Each computer can also include a network connection 112 over which data, including, e.g., text objects, and instructions can be transferred. Additional mass storage devices (not shown) may also be connected to CPU 102 through network connection 112. It will be appreciated by those skilled in the art that the above described hardware and software elements are of standard design and construction.

Figure 3B:
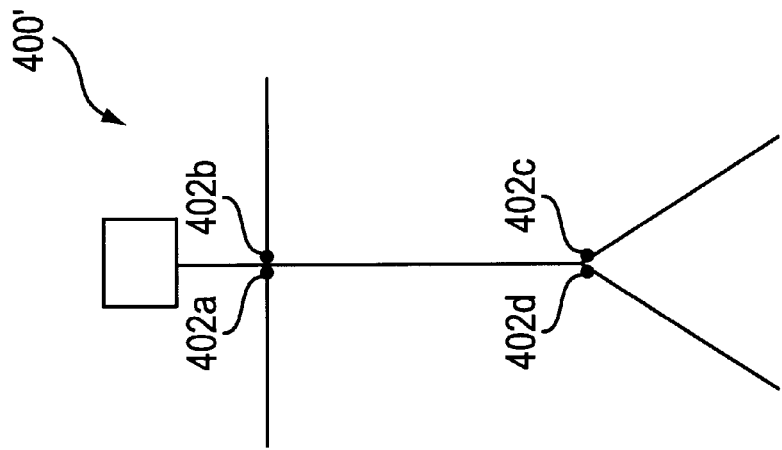
FIGS. 3A–3C illustrate a creation of an animatable character utilizing the system and method for providing an animatable character according to the present invention.
Figure 3A:
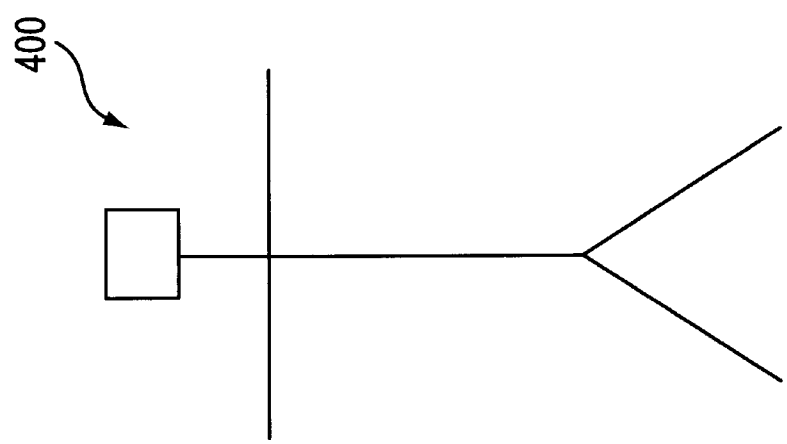
Figure 3C:
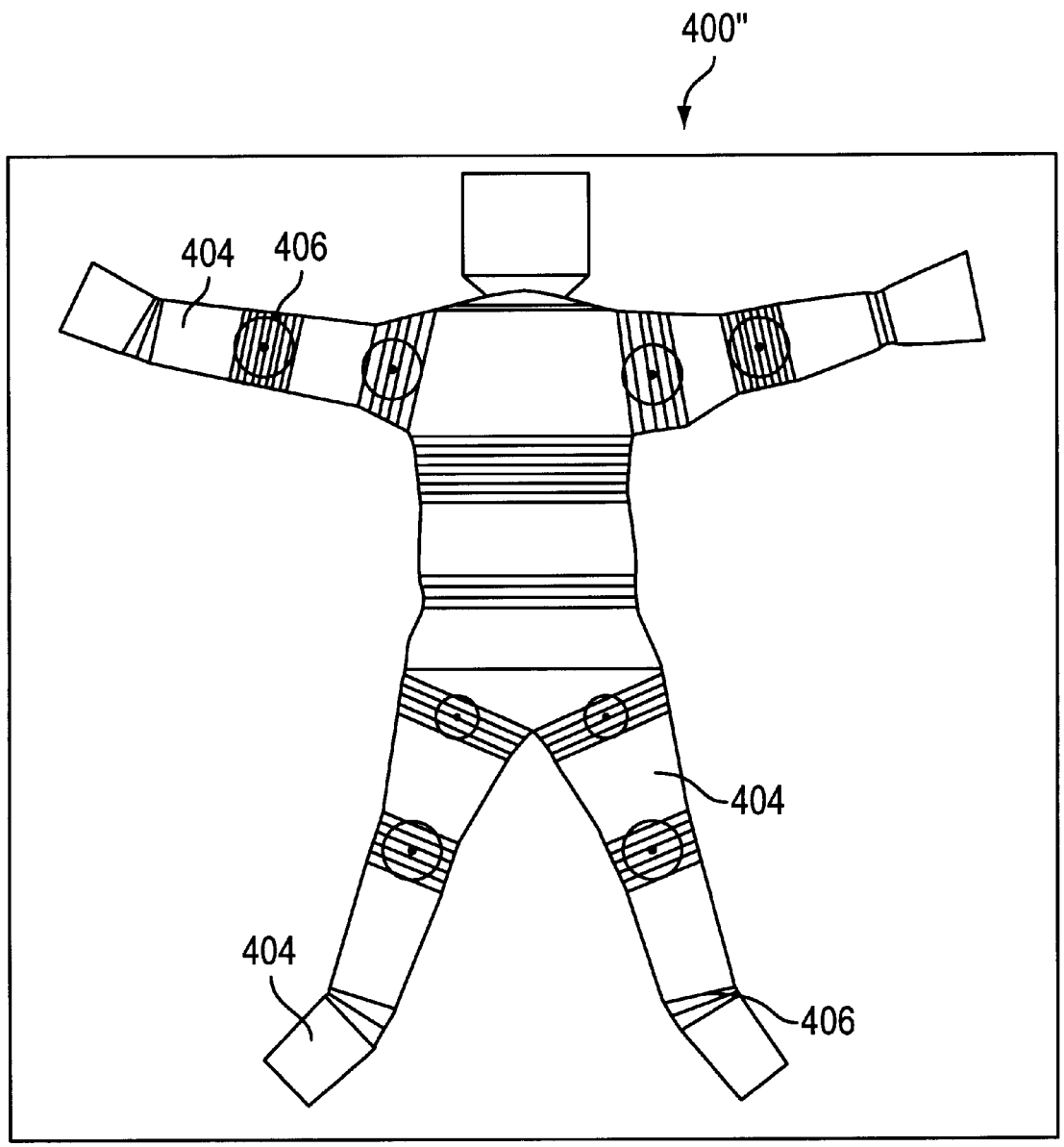

FIGS. 3A–3C illustrate a method for providing an animatable character according to the present invention. First, a user can determine the topology of a character which is being created. For example, a skeleton 400 of a person can be created as shown in FIG. 3A. Alternatively, the character may be any object which the user may wish to make animatable, such as a teddy bear or a lamp.

Next, the user can determine where motion is to occur. For example, the skeleton 400' of a person can have points 402A–402D as locations where motion can occur.

FIG. 3C is an example of a skeleton 400" of a character which a user may wish to make animatable. The portion of the character which are to remain substantially rigid will herein be referred to as rods 404. The portions where the character is movable will herein be referred to as joints 406. Note that the rods 404 need only maintain its structural integrity when the joints are in motion. The parameters of the rods can be changed according to the user's preferences. Thus, for example, the arms can be elongated, the waist can be cinched, the feet can be enlarged, and the head can be detached.

Figure 4:
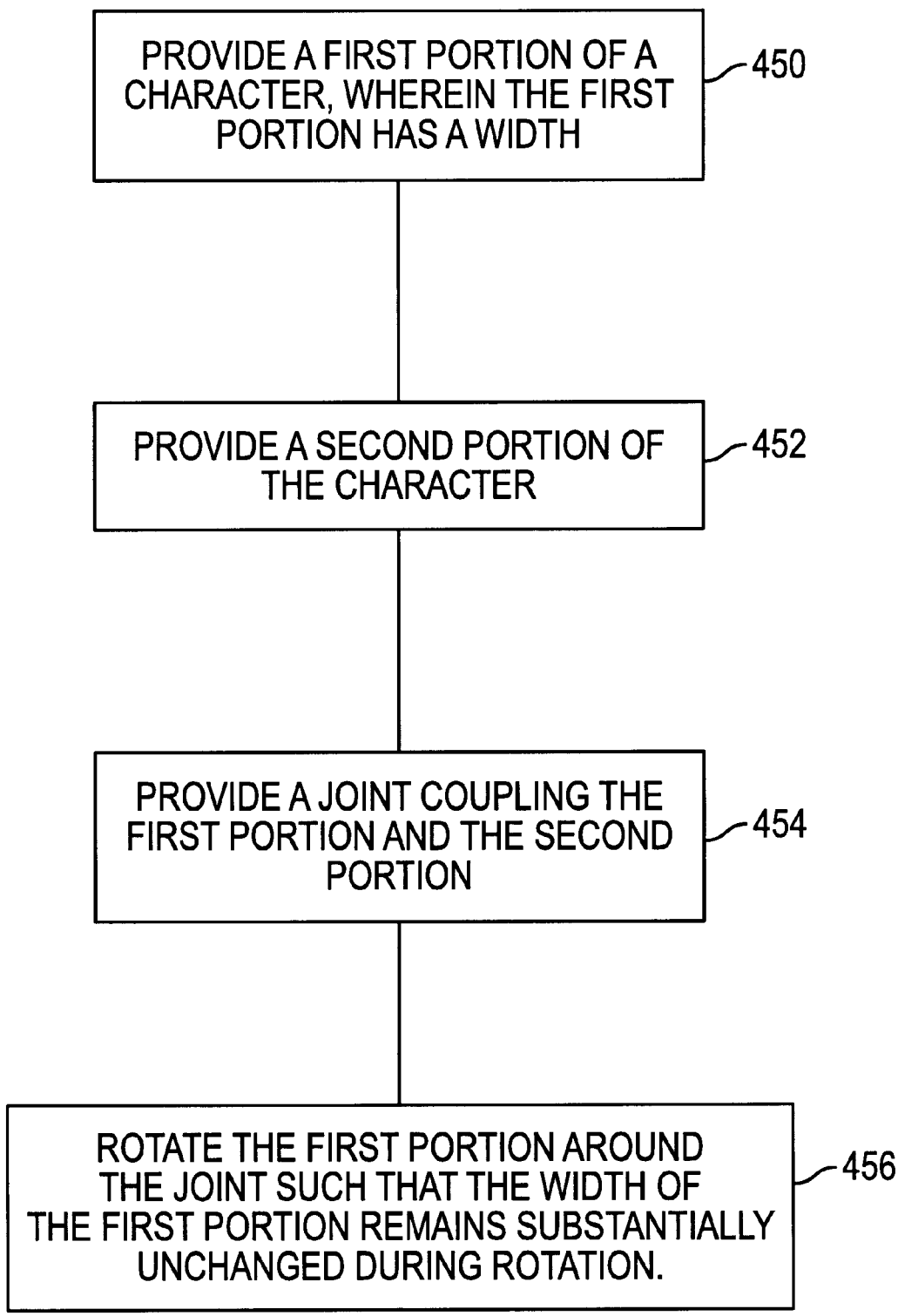
FIG. 4 is a flow diagram of a method according to the present invention for providing an animatable character.

FIG. 4 is a flow diagram of a method according to the present invention for providing an animatable character. A first portion of a character is provided via step 450, wherein the first portion has a width. A second portion of the character is provided via step 452. A joint coupling the first portion and the second portion is also provided via step 454. The first portion is then rotated around the joint such that the width of the first portion remains substantially unchanged during rotation via step 456. Accordingly, in our example, when an arm is rotated "down" then the arm will appear substantially the same as it had prior to rotating it "down", except for its position.

In order to accomplish the method according to the present invention described in FIG. 4, various joint designs may be used to accomplish the end result of substantial structural integrity during and immediately after movement. Two examples of joints which can be used according to the system and method of the present invention are what is herein referred to as center pin joints, and center radial joints. Either of the exemplary joints can be made from various geometric shapes. Preferably, they are a compilation of polygons. For example, these joints can be created out of two or more rectangles, trapezoids, or triangles.

In general, the joints in the characters have a rotational pivot located half way between the top and bottom edges (when the rotational angle is zero degrees, i.e. prior to any movement). Both rods and joints include a top width, bottom width, and length parameters. In addition, there is rotational angle, which contributes to the local transform passed on to further body parts in the transformational chain.

Figure 5:
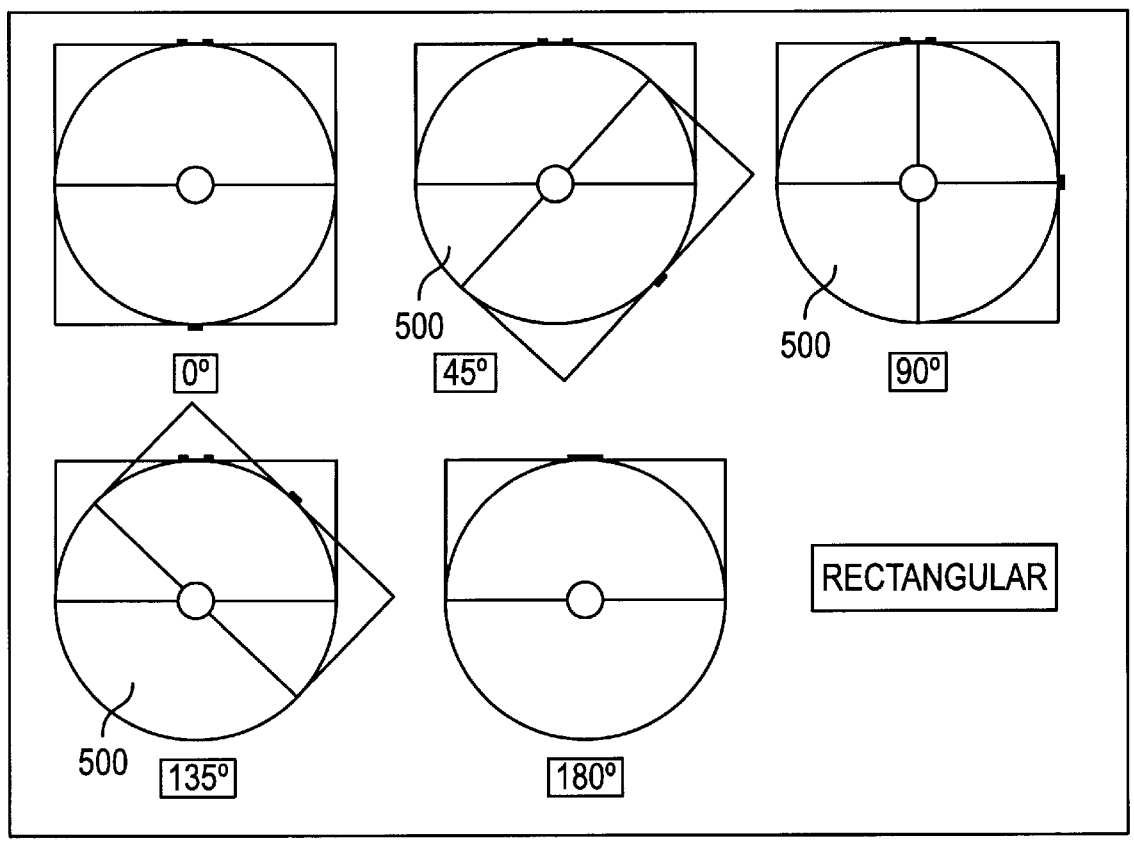
FIG. 5 shows a schematic diagram of a rectangular center pin joint according to the present invention.
Figure 6:
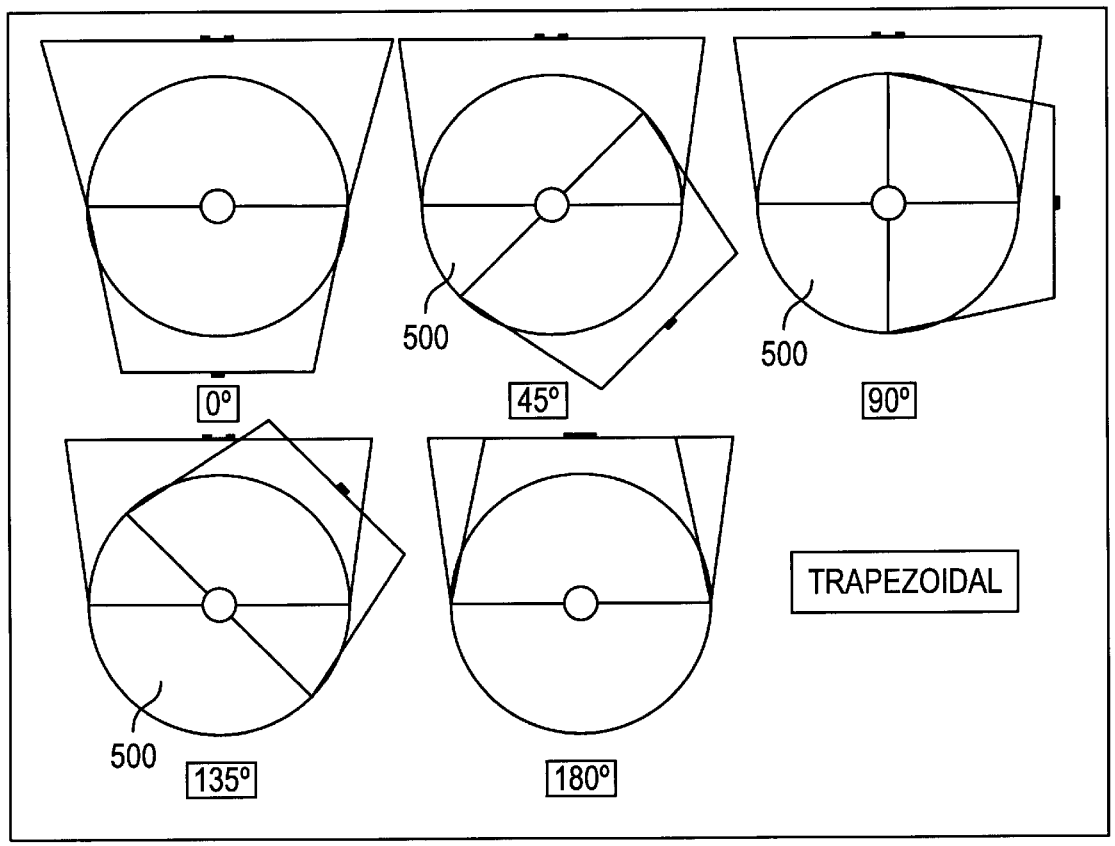
FIG. 6 shows a schematic diagram of a trapezoidal center pin joint according to the present invention.

FIG. 5 is a schematic diagram of a rectangular center pin joint according to the present invention. FIG. 6 shows a schematic diagram of a trapezoidal center pin joint. The center pin joint is a non-segmented joint. A non-segmented joint is herein meant to describe a joint which consists of approximately two polygons. The center pin joint can be imagined as taking two abutting rectangles and sticking a pin through the center of the common edge. Both half of the joint experience no substantial distortion as the joint angle is varied. However, the center pin joint may be discontinuous in some way when one portion of the joint is being rotated. For example, when the rotation angle is non-zero, a roughly triangular shaped gap 500 appears on one lengthwise side of the joint, and the bottom half rectangle or trapezoid of the joint will overlap the top half on the other side of the joint.

Figure 7:
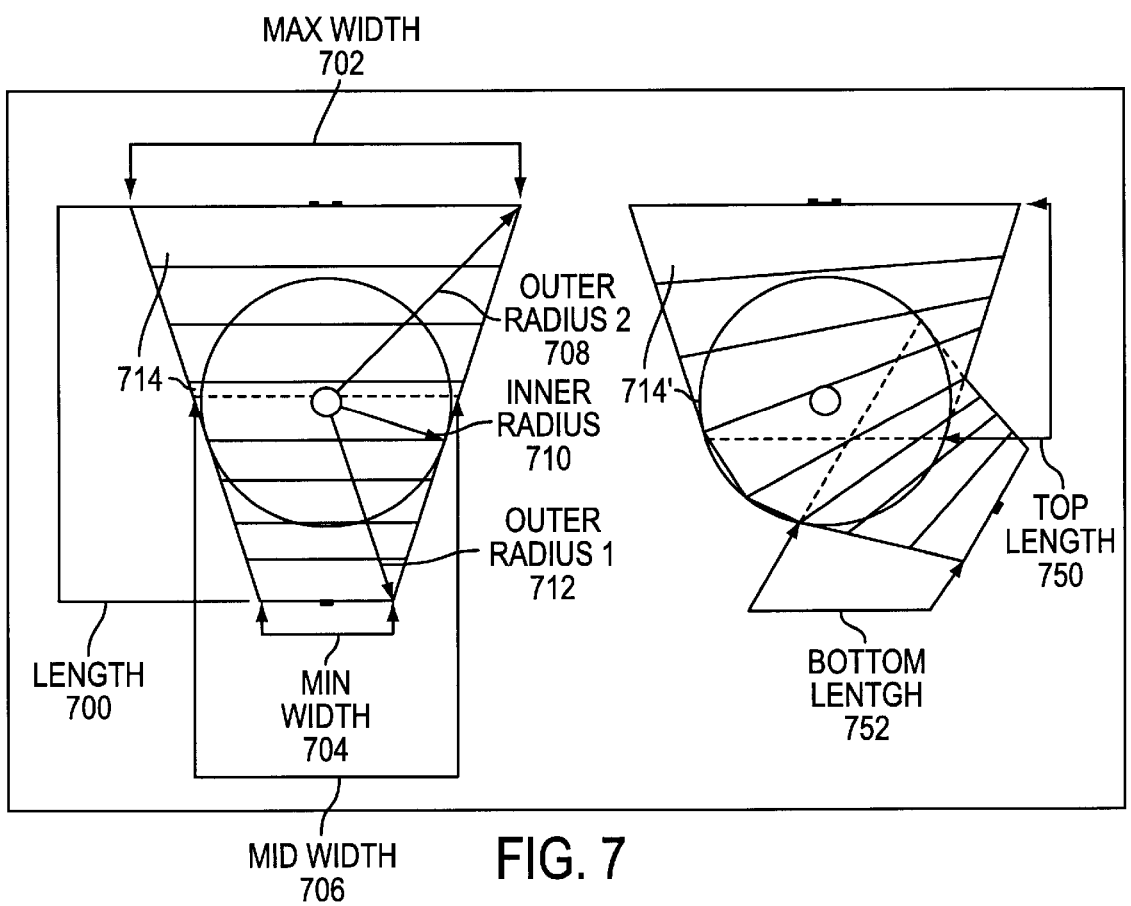
FIG. 7 shows a schematic diagram of a center radial joint according to the present invention.

FIG. 7 shows a schematic diagram of a center radial joint. In this example, a trapezoidal center radial joint is shown. The center radial joint is a segmented joint. Segmented joints have the properties that they appear to retain texture map continuity when the joint is rotated, however, the interiors of the segments will be warped in some manner. Segmented joints consists of two or more geometric shapes such as polygons.

The center radial joint shown in FIG. 7 shows properties of the center radial joint which apply to both trapezoidal and rectangular center radial joints. The properties shown include length 700, which includes the sum of all of the segments 714. The top width 702 and the bottom width 704 is also shown. In the example given, the maximum width is also the top width 702 and the minimum width is also the bottom width 704. Also shown is the mid width 706, the outer radius 2 (708), the outer radius 1 (712), and the inner radius 710. Additionally, the top length 750 and the bottom length 752 are also shown.

Various relationships and algorithms related to the properties shown are as follows:

MinWidth=min(TopWidth, BottomWidth)

MaxWidth=max(TopWidth, BottomWidth)

OuterRadius1=sqrt(minWidth$^2$+Length$^2$)/2

Outer Radius2=sqrt(maxWidth$^2$+Length$^2$)/2

Diff=(TopWidth—BottomWidth)/(2*Length)

InnerRadius=(TopWidth+BottomWidth)/(4*sqrt(1+diff$^2$))

CritAng1=2*ArcCosine(InnerRadius/OuterRadius1)

CritAng2=2*ArcCosine(InnerRadius/OuterRadius2)

MidWidth=(TopWidth+BottomWidth)/2

DiffLength2=InnerRadius$^2$*(1–4*InnerRadius$^2$/(MidWidth$^2$))

DiffLength=sqrt(max(DiffLength2, 0))

If(TopWidth<BottomWidth)DiffLength=–DiffLength

TopLength=Length/2+DiffLength;

Bottom Length=Length/2–DiffLength

Figure 8:
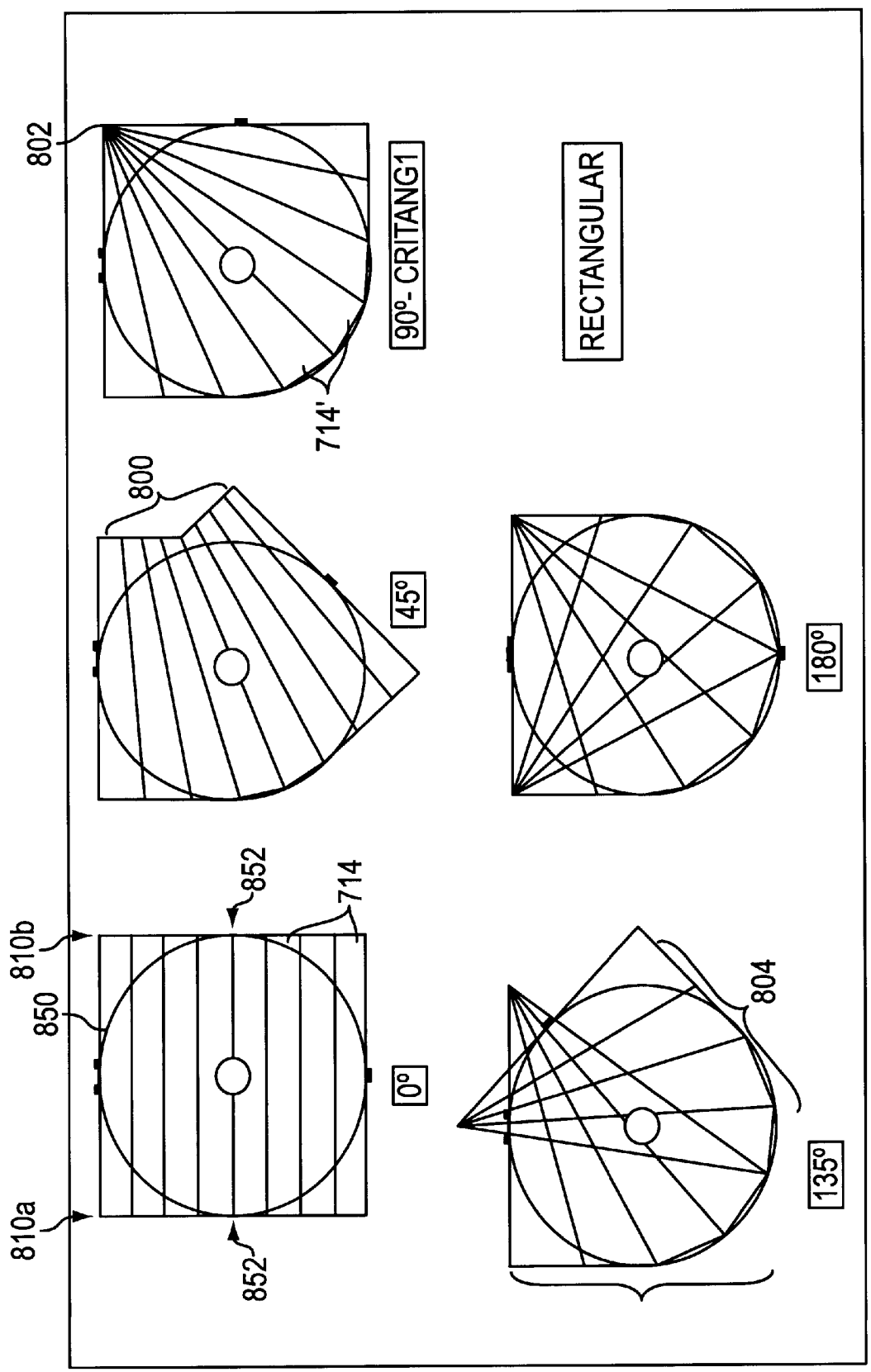
FIG. 8 shows a schematic diagram of a rectangular center radial joint according to the present invention.
Figure 9:
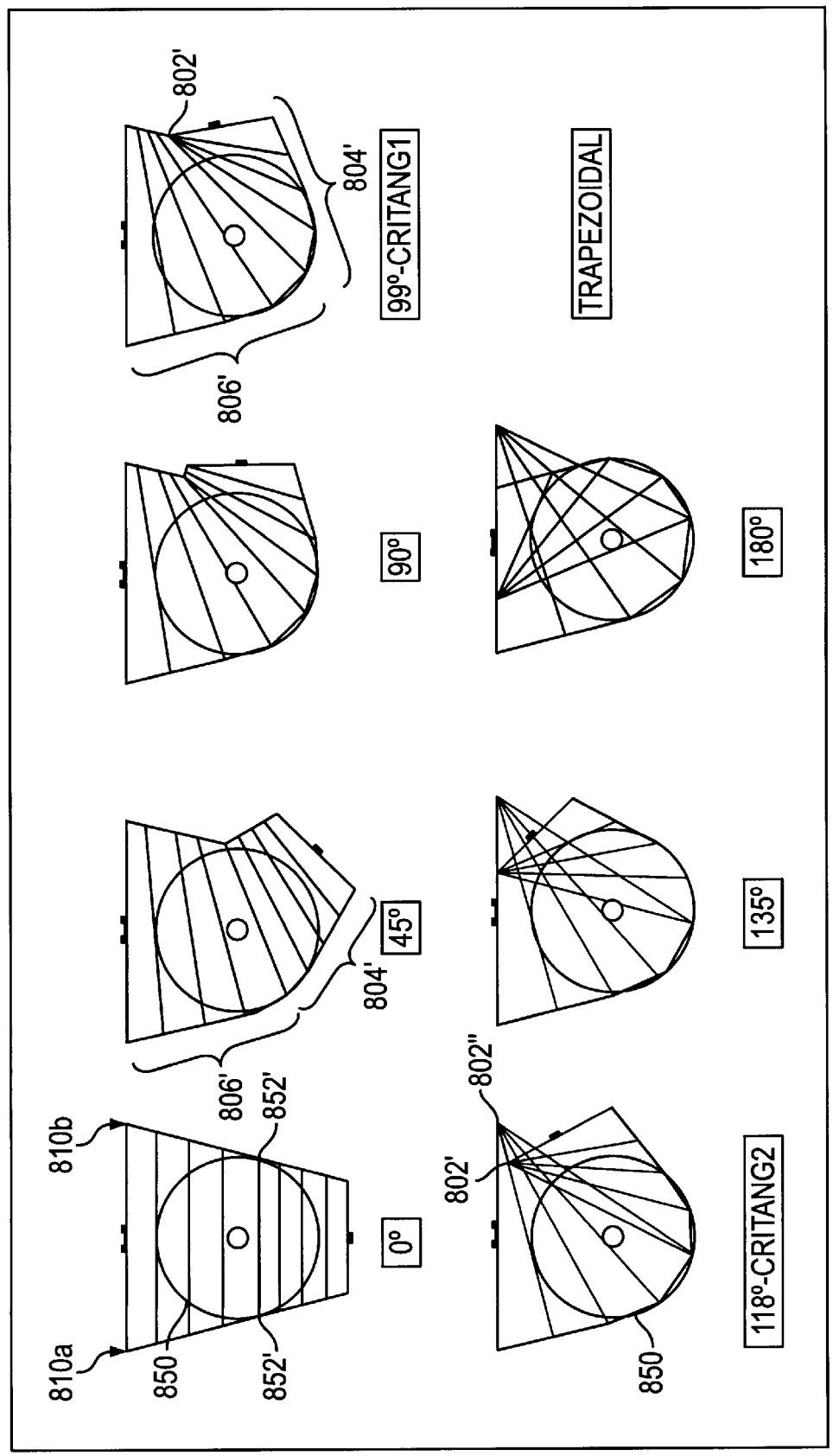
FIG. 9 shows a schematic diagram of a trapezoidal center radial joint according to the present invention.

FIG. 8 shows a schematic diagram of a rectangular center radial joint according to the present invention. FIG. 9 shows a schematic diagram of a trapezoidal center radial joint according to the present invention. The center radial joint is a simple, continuous shape from the top edge to the bottom edge from zero angle of rotation (i.e. prior to movement) until the absolute value of the rotation angle passes through a critical angle (CritAng1). At critical angle 1 the edges 800 of the segment 714' form a cusp 802, and further rotation leads to the overlap of the bottom half 804 of the joint with the top half 806 of the joint. In its rectangular form, as shown in FIG. 8, there is only one critical angle for which both the top half 806 and the bottom half 804 of the joint come to a cusp 802 at the same time. As previously stated, critical angle 1 can be calculated as follows:

CritAng1=2*ArcCosine(InnerRadisu/OuterRadius1)

However, in its trapezoidal form, there are two critical angles, one where the bottom half segments 804' form a cusp 802' and one where the top half segments 806' form a cusp 802". The specific values for the critical angles can be computed from the parameters of the geometry, namely the top width, the bottom width, and the length, as detailed in the equations shown above. As previously stated, critical angle 1 and critical angle 2 can be calculated as follows:

CritAng1=2*ArcCosine(InnerRadius/OuterRadius1)

CritAng2=2*ArcCosine(InnerRadius/OuterRadius2)

Under joint rotation of the center radial joint, the geometry of the segments 714 undergo a deformation into segments 714' as shown in FIG. 8. Without intervention, the coordinates of the vertices of the segment would turn into "bow-tie" quadrilaterals. A bow-tie quadrilateral is a quadrilateral whose edges cross themselves. Bow-tie quadrilaterals undesirably distort the texture mapping rendering which can be used on various animatable characters. Bow-tie quadrilaterals can be avoided by modifying the behavior of the joint at the critical angle. When segments become triangles at the critical angles, they continue to exist as triangles beyond the critical angle, thus avoiding the bow-tie quadrilateral problem.

Under rotation, one lengthwise edge 810A–810B of the joint increases in length, while the remaining lengthwise edge shortens. For example, the left edge, 810A can increase in length while the right edge 810B shortens during rotation. In this example, the left edge 810A increases by the arc length of the rotation angle, at a constant radius defined by a circle 850. This circle 850 is centered at the midpoint of the joint and is tangent to the polygonal shape of the joint itself when the rotation angle is zero (i.e. prior to movement). Note that in the restricted rectangular case, the segments 714 are distributed equally on each side of the joint, since the tangent points 852 lie on a diameter of the circle 850, as can be seen in FIG. 8.

However, in the more general trapezoidal case, the tangent points 852' are connected by a line which lies below the center of the circle 850. This line divides the joint trapezoid into two sub-trapezoids of unequal length. Both trapezoids are constrained by the circle 850 when the joint is rotated, and their edges 810A–810B continue to be tangent to the circle 850. However, the edges of the two sub-trapezoids which are being shortened, in our example the right hand edge 810B, intersect . The intersection point is calculated and the total length of the right hand edge can be derived. The total length of the right hand edge 810B is the length of the original right hand edge, less the length of the edges beyond the intersection point which are closest to the circle. This continues until the first critical angle is reached. At this point, one of the sub-trapezoids' (or both in the rectangular case) effective right edge has shrunk to a point or a cusp 802 and 802'. All width-wise segment edges for that sub-trapezoid terminate on the right hand side at that point. This continues as the rotation angle is increased, until the remaining sub-trapezoids' right hand edge is shrunk to a point at the second critical angle. In the example shown in FIG. 9, the first critical angle is shown to be 99°, while the second critical angle is shown to be 118°. The all width-wise segment edges for that sub-trapezoid terminate on the right hand side at that point. Finally, at 180° of rotation, the edge which has been increasing in length during rotation, in our example the left edge, is equal to the original left edge length plus 180° of arc.

Figure 10:
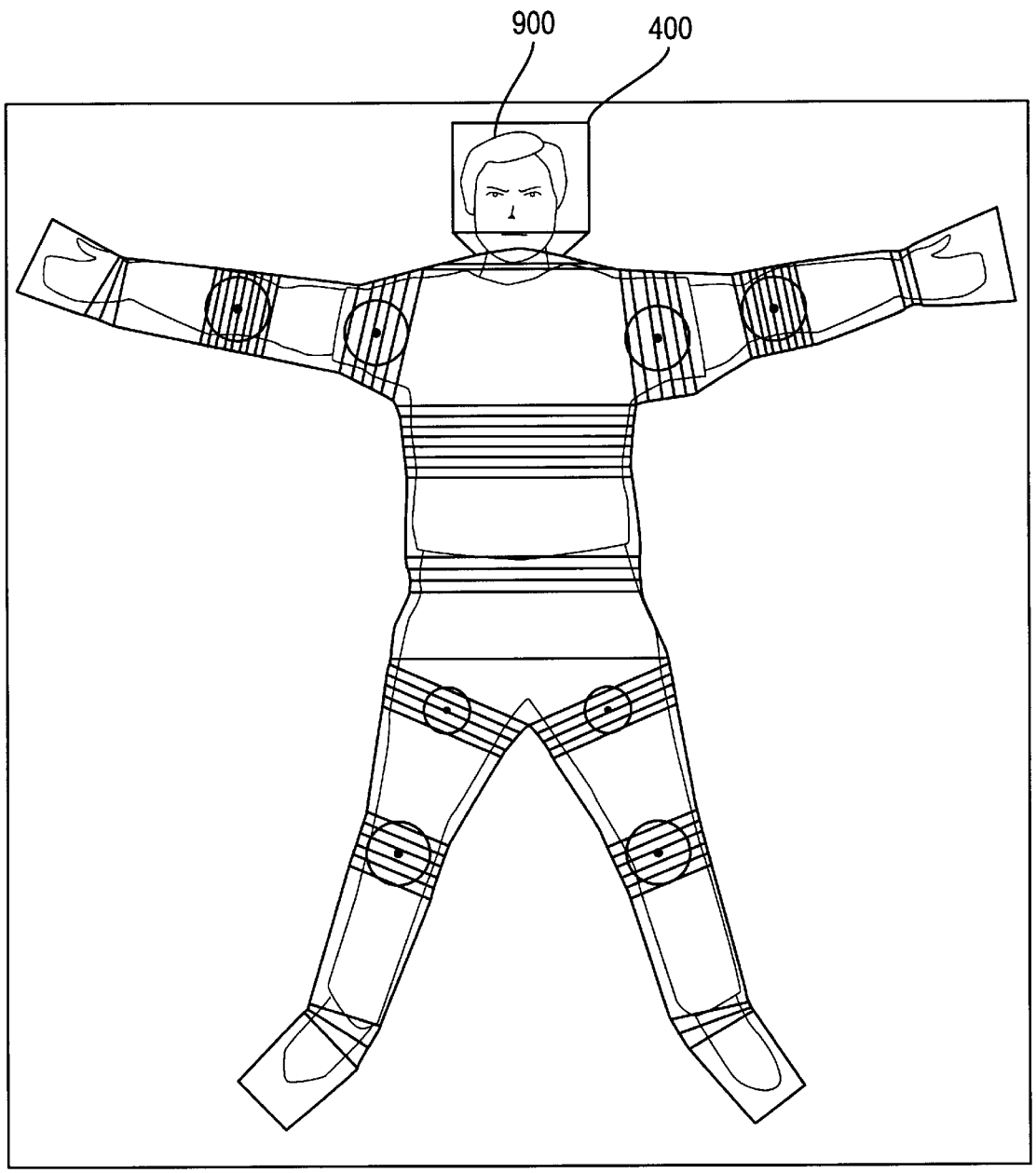
FIGS. 10–12 show an example of how a single static image of a character can be made animatable by utilizing the system and method for providing an animatable character according to the present invention.
Figure 11A:
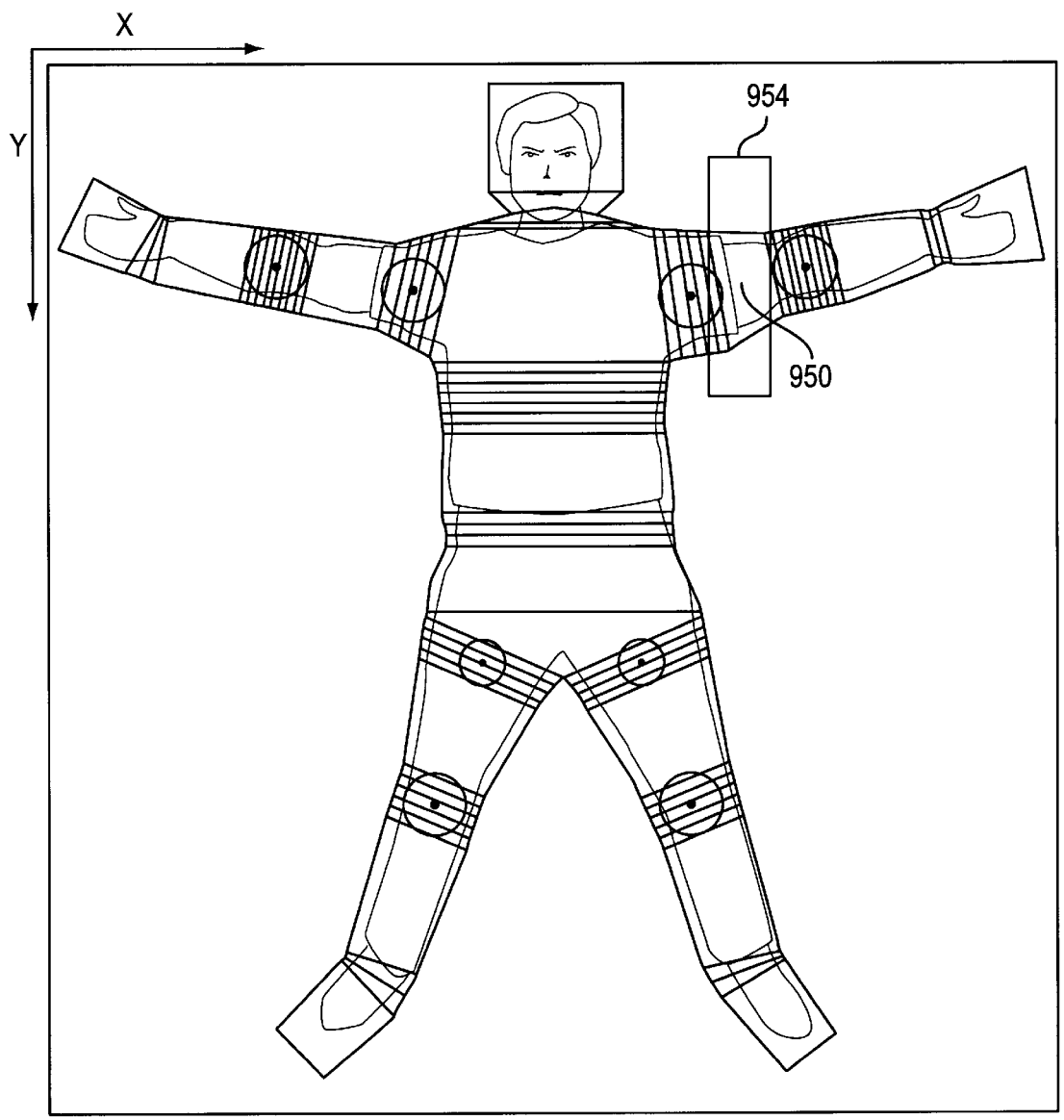
Figure 11B:
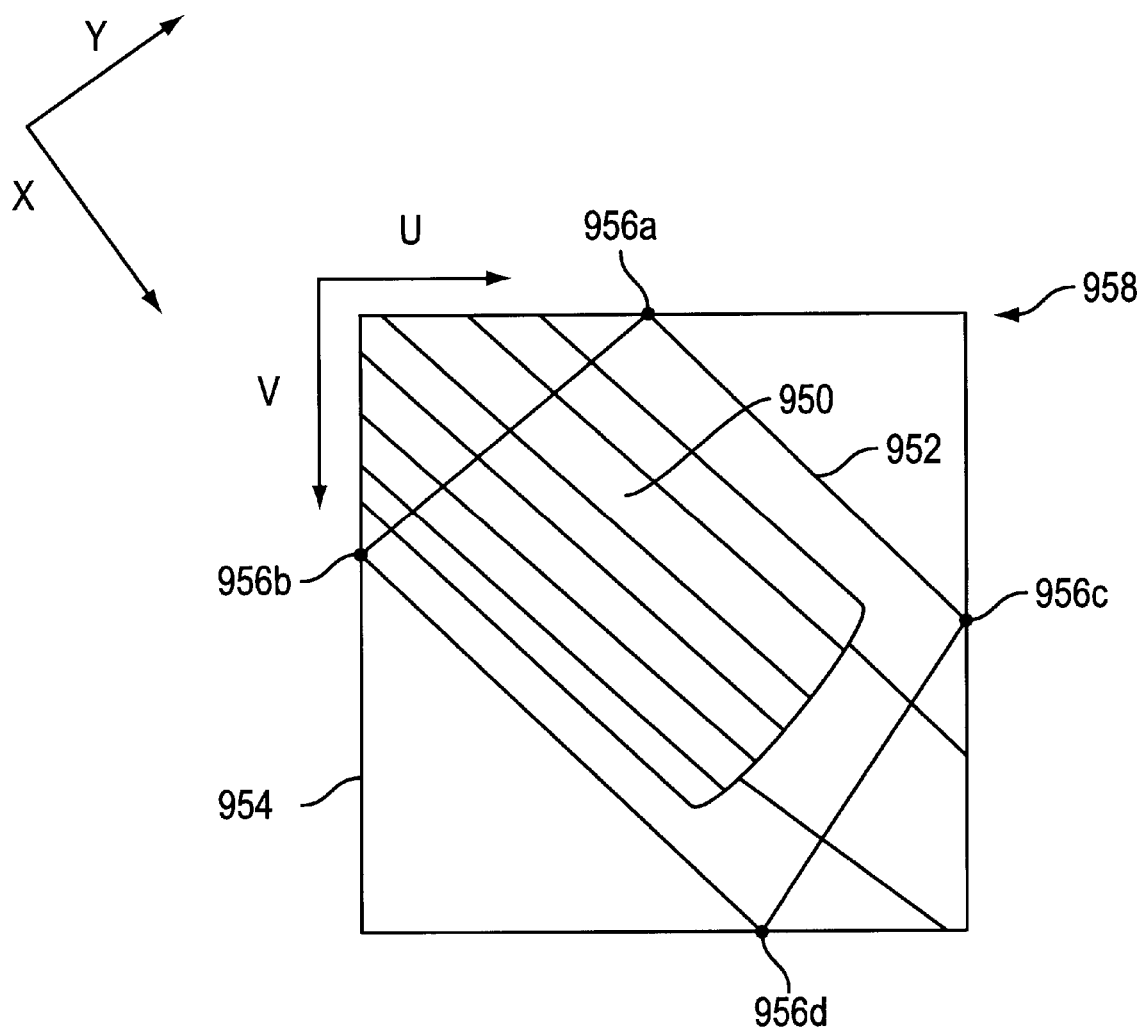
Figure 12:
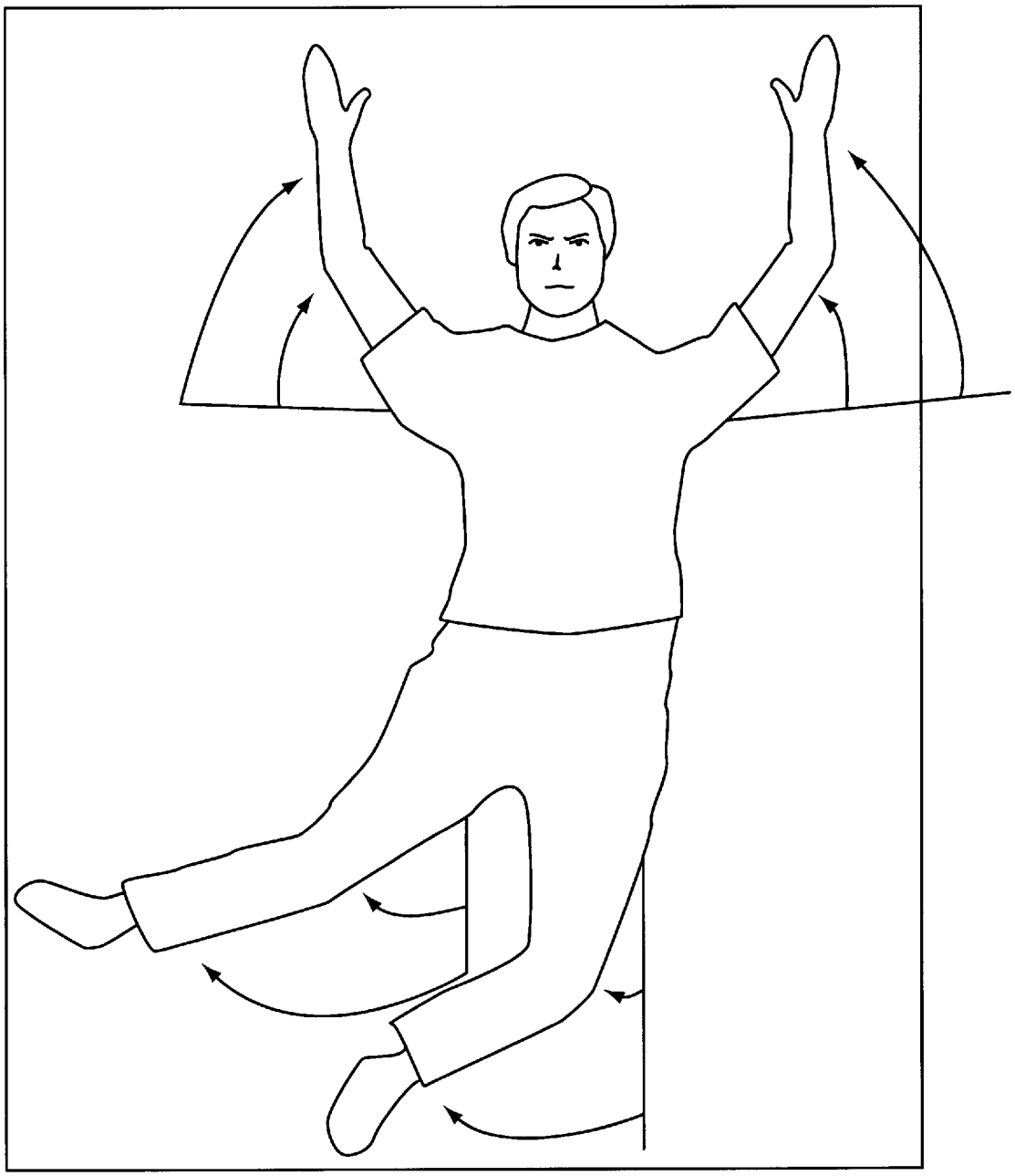

FIGS. 10–12 illustrate an example of an application in which the method and system according to the present invention can be utilized. FIG. 10 shows a static image of a character overlapping with the skeleton 400" shown in FIG. 3C, thereby creating a customized character. This process is described in detail in co-pending U.S. Ser. No. 60/062,361, which is incorporated herein by reference.

FIGS. 11A and 11B illustrate texture mapping which can accompany the overlapping of the static image 900 with the skeleton 400". Texture mapping is well known in the field of art. For example, basic principles of texture mapping can be found in *Advanced Animation & Rendering Techniques*, Chapter 6, "Mapping Technique: Texture & Environmental Mapping", Alan Watt, Mark Watt, Addison Wesley (1992). Laminating the texture map onto the skeleton allows consistency in the texture of a component of the desired object when that component is moved. For example, when an arm is moved from a vertical position to a horizontal position, the stripes on the sleeve of the arm will also appear to move from the vertical position to the horizontal position. Texture mapping for purposes of the present invention can be performed in various ways, including affine mapping, perspective mapping, and bilinear mapping.

In the example shown in FIGS. 11A and 11B, a texture map area 454 is associated with a portion of the character as shown in FIG. 11A. The portion associated with the texture map area 954 is shown as an arm 950, which also includes a portion of a sleeve with stripes on it. The pixels included in the area associated with the texture map area 954 are copied and transformed from an (x,y) coordinate associated with the pixels to a (u,v) coordinate associated with the texture map area 954. The transformed, copied pixels are typically referred to as texels.

FIG. 11B shows the texture map area 954 including texels. A region 952 is associated with the texture map area 954. The texture map area 954 includes all the pixels within the area, which are typically referred to as texels. The texture map area 954 typically includes representative points, in this example, the vertices 956a–956d. Data related to these vertices 956a–956d include (x,y) coordinates related to the display and they also include (u,v) coordinates related to the texture mapping area 954. The (u,v) coordinates of the vertices 956a–956d can be derived through various methods. One method of deriving the (u,v) coordinates is described below.

The (u,v) coordinates range from 0 to 1. The u and v coordinates can be derived as ratios to the height and width of the bounding texture map area 954. For instance, if the top boundary 958 of the texture mapping area 954 is one hundred texels wide and if the vertex 956a is at the twenty-fifth texel counting from the upper left corner of the texture mapping area 954, then the vertices 956a will have a (u,v) coordinate of (0,0.25). (25/100=0.25) The (u,v) coordinate does not change regardless of how the character is moved within the display. Thus, the vertices 956a–956d can have their (x,y) coordinates changed without affecting their (u,v) coordinates. When the texels are scanned, the (u,v) coordinate of the non-vertices texels are interpolated, such that only the (u,v) coordinates of the vertices 956a–956d need be stored. Additionally, only the image included in the region 452 will be scanned out, such that the remaining portions of the character outside the region 452, but within the texture map area 454 will not be addressed. Accordingly, the texture appears consistent with the rest of the shirt when a portion of the shirt is moved.

FIG. 12 in an illustration of the customized character 900 after portions of the character have been moved. Despite the fact that the character is initially created in a static pose, it is animatable after it is created. For instance, although it is preferred that the desired object, such as a child, poses in a single pose, preferably arms out and legs apart, this digitized image can be animated once the character of the child is created. In FIG. 12, the arms have been rotated upward while the legs have been rotated in a clockwise direction. Thus the character can be animated in whatever manner the user chooses.

A method and system for generating an animatable character has been disclosed. Software written according to the present invention is to be stored in some form of computer-readable medium, such as memory or CD-ROM, or transmitted over a network, and executed by a processor.

Although the foregoing invention has been described in some details for the purposes of clarity of understanding, it will be apparent that certain changes and modifications may be practiced within the scope of the appended claims. It should be noted that there may be alternative ways of implementing both the process and apparatus of the present invention. Accordingly, the present embodiments are to be considered as illustrative and not restrictive, and the invention is not to be limited to the details given herein, and that it may be modified within the scope and equivalence of the appended claims.

What is claimed is:

1. A method for providing an animatable character displayed via a computer system comprising:
   providing a first portion of the character, wherein the first portion has a width;
   providing a second portion of the character;
   providing a joint coupling the first portion and the second portion, wherein the joint includes at least two segments, wherein specific segments become triangles at a predetermined angle, and wherein the specific segments continue to exist as triangles when an angle of rotation passes beyond the predetermined angle; and
   rotating the first portion around the joint such that the width of the first portion remains substantially unchanged during rotation displaying the animable character.

2. The method of claim 1, wherein the joint is a center pin joint.

3. The method of claim 1, wherein the joint includes more than two segments.

4. The method of claim 3, wherein the joint retains a continuous shape from a top edge of at least one of the segments to a bottom edge of at least one of the segments from a Ø angle of rotation until an absolute value of a rotation angle passes through a predetermined angle.

5. The method of claim 3, wherein at least one of the segments includes edges, and wherein the edges form a cusp at a predetermined angle.

6. The method of claim 3, wherein at least one of the segments is a polygon including parameters.

7. The method of claim 6, wherein the parameters of the polygon change during the rotation.

8. The method of claim 6, wherein the polygon further includes a first edge, wherein the first edge increases in length during the rotation.

9. The method of claim 8, wherein the first edge increases in length by at least a portion of an arc length of a rotation angle, the arc length being defined by a circle with a constant radius.

10. The method of claim 9, wherein the circle is centered at a midpoint of the joint.

11. The method of claim 10, wherein the joint includes a polygonal shape and the circle is tangent to the polygonal shape when the rotation angle is zero.

12. The method of claim 11, wherein the polygonal shape is a trapezoid.

13. The method of claim 12 wherein locations where the circle is tangent to the trapezoid are tangent points, and wherein the tangent points are located such that a line connecting the tangent points would not pass a center of the circle.

14. The method of claim 6, wherein the polygon further includes a second edge, wherein the second edge decreases in length during the rotation.

15. The method of claim 1, wherein the joint includes an approximately rectangular shape.

16. The method of claim 1, wherein the joint includes an approximately trapezoidal shape.

17. The method of claim 16, further including a step of charging the approximate trapezoidal shape into an approximate triangular shape when a rotation angle reaches a predetermined angle.

18. The method of claim 17 wherein the approximate triangular shape is retained when the rotation angle passes beyond the predetermined angle.

19. A system for providing an animatable character displayed via a computer system comprising:
- a first portion of the character, wherein the first portion has a width;
- a second portion of the character;
- a joint coupling the first portion and the second portion, wherein the joint includes at least two segments, wherein specific segments become triangles at a predetermined angle, and wherein the specific segments continue to exist as triangles when an angle of rotation passes beyond the predetermined angle; and
- means for rotating the first portion around the joint such that the width of the first portion remains substantially unchanged during rotation means for displaying the animable character.

20. The system of claim 19, wherein the joint is a center pin joint.

21. The system of claim 20, wherein the joint includes more than two segments.

22. The system of claim 21, wherein the joint retains a continuous shape from a top edge of at least one of the segments to a bottom edge of at least one of the segments from a Ø angle of rotation until an absolute value of a rotation angle passes through a predetermined angle.

23. The system of claim 21, wherein at least one of the segments includes edges, and wherein the edges form a cusp at a predetermined angle.

24. The system of claim 21, wherein at least one of the segments is a polygon including parameters.

25. The system of claim 24, wherein the parameters of the polygon change during the rotation.

26. The system of claim 24, wherein the polygon further includes a first edge, wherein the first edge increases in length during the rotation.

27. The system of claim 26, wherein the first edge increases in length by at least a portion of an arc length of a rotation angle, the arc length being defined by a circle with a constant radius.

28. The system of claim 27, wherein the circle is centered at a midpoint of the joint.

29. The system of claim 28, wherein the joint includes a polygonal shape and the circle is tangent to the polygonal shape when the rotation angle is zero.

30. The system of claim 29, wherein the polygonal shape is a trapezoid.

31. The system of claim 30 wherein locations where the circle is tangent to the trapezoid are tangent points, and wherein the tangent points are located such that a line connecting the tangent points would not pass a center of the circle.

32. The system of claim 24, wherein the polygon further includes a second edge, wherein the second edge decreases in length during the rotation.

33. The system of claim 19, wherein the joint includes an approximately rectangular shape.

34. The system of claim 19, wherein the joint includes an approximately trapezoidal shape.

35. The system of claim 34, wherein the approximate trapezoidal shape changes into an approximate triangular shape when a rotation angle reaches a predetermined angle.

36. The system of claim 35 wherein the approximate triangular shape is retained when the rotation angle passes beyond the predetermined angle.

\* \* \* \* \*

UNITED STATES PATENT AND TRADEMARK OFFICE
CERTIFICATE OF CORRECTION

PATENT NO. : 6,118,459  
DATED : September 12, 2000  
INVENTOR(S) : Kevin L. Hunter Page 1 of 1

It is certified that error appears in the above-identified patent and that said Letters Patent is hereby corrected as shown below:

Title page,
No 57, under ABSTRACT, reads:
"ajoint which connects two portions of the character. When" It should read: -- a joint which connects two portions of the character. When --

Column 1,
In the Reference to Related Applications, line 9, reads:
"currently herewith, with are incorporated herein by refer-". it should read: -- currently herewith, which are incorporated herein by refer --;

Column 4,
In the Detailed Description of the Preferred Embodiments, line 43, reads:
"pin through the center of the common edge. Both half of the-". It should read: -- pin through the center of the common edge. Both halves of the --;

Column 6,
In the Detailed Description of the Preferred Embodiments, line 25, reads:
"edge 810B, intersect. The intersection point is calculated". It should read: -- edge 810B, intersect. The intersection point is calculated --;

Column 7,
In the Detailed Description of the Preferred Embodiments, line 60, reads:
"some details for the purposes of clarity of understanding, it". it should read: -- some detail for the purposes of clarity of understanding, it --;

Signed and Sealed this

Twelfth Day of March, 2002

*Attest:*

JAMES E. ROGAN
*Director of the United States Patent and Trademark Office*

*Attesting Officer*